March 17, 1964  V. D. RAMSEUR, JR  3,125,192
PANEL CONNECTOR ASSEMBLY
Filed March 6, 1961  2 Sheets-Sheet 1
Fig. 1.
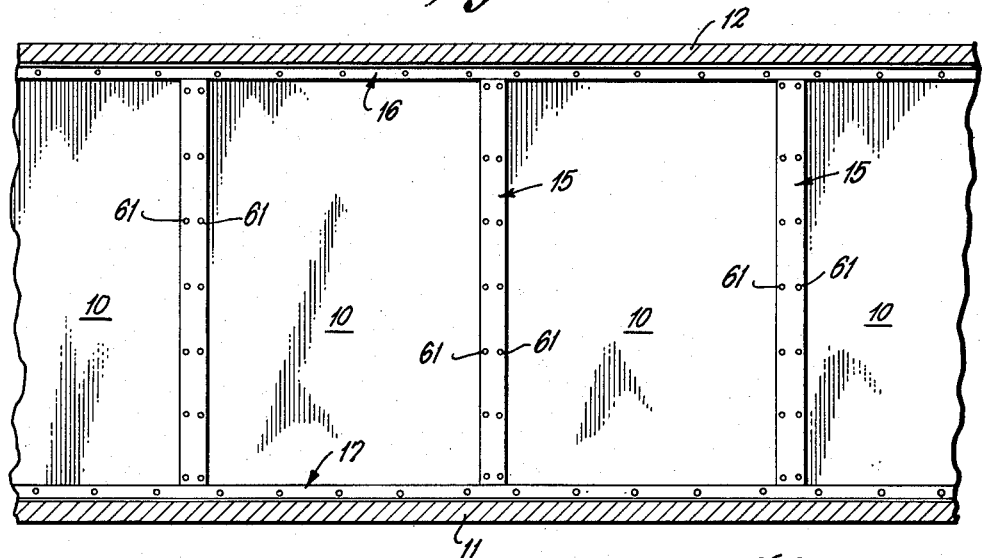
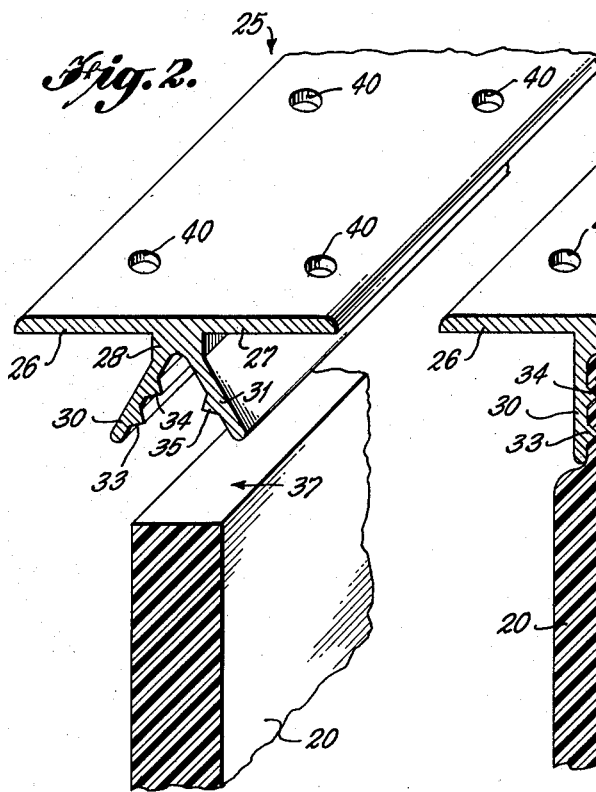
Fig. 2.
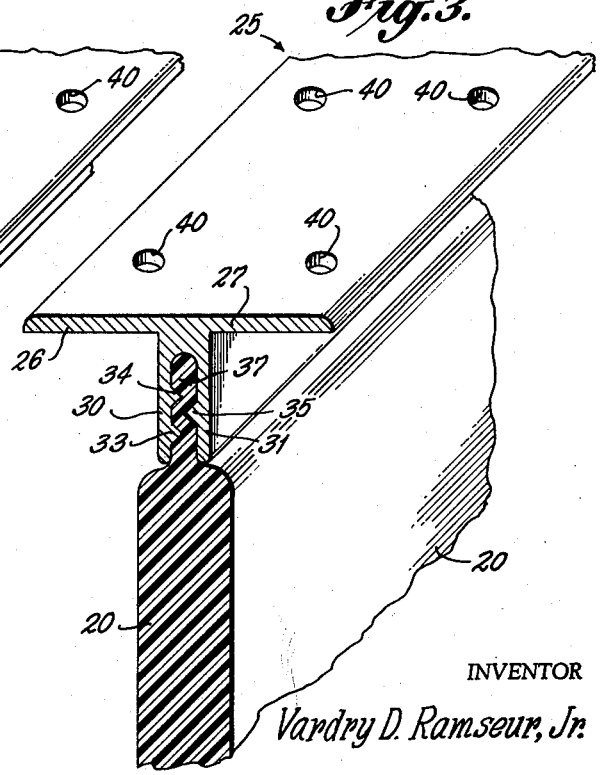
Fig. 3.
INVENTOR
Vardry D. Ramseur, Jr.
BY Shoemaker and Mattare
ATTORNEYS March 17, 1964   V. D. RAMSEUR, JR   3,125,192
PANEL CONNECTOR ASSEMBLY
Filed March 6, 1961   2 Sheets-Sheet 2
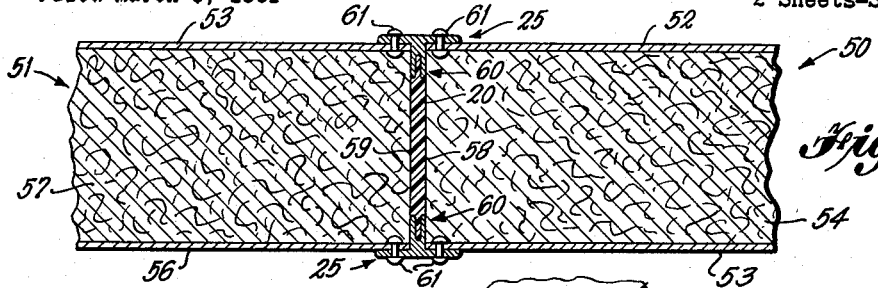
Fig. 4.
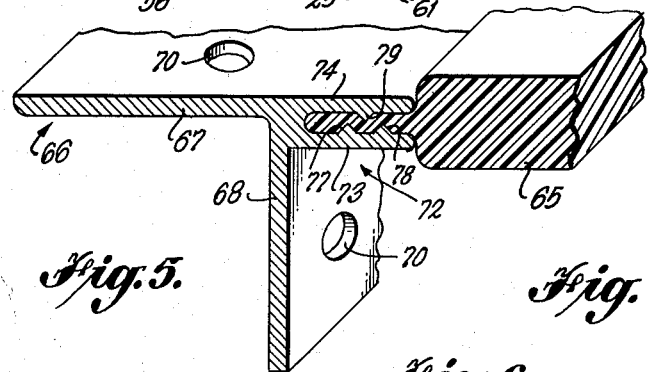
Fig. 5.
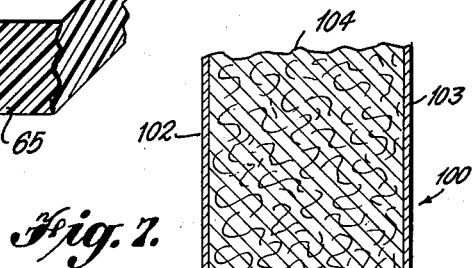
Fig. 7.
Fig. 6.
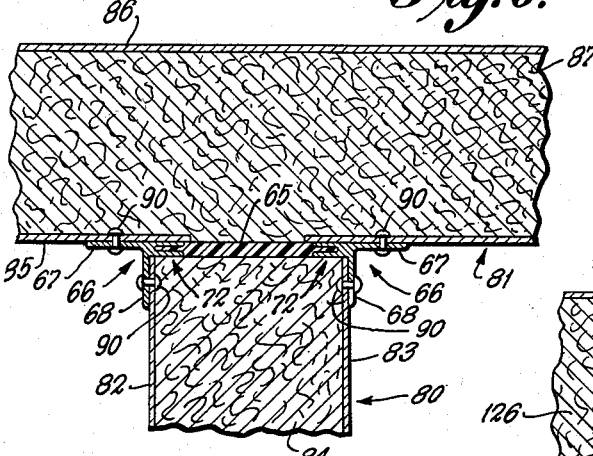
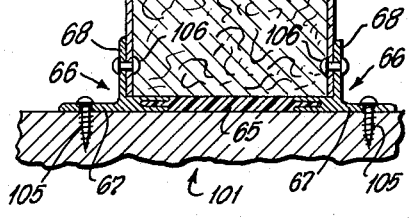
Fig. 8.
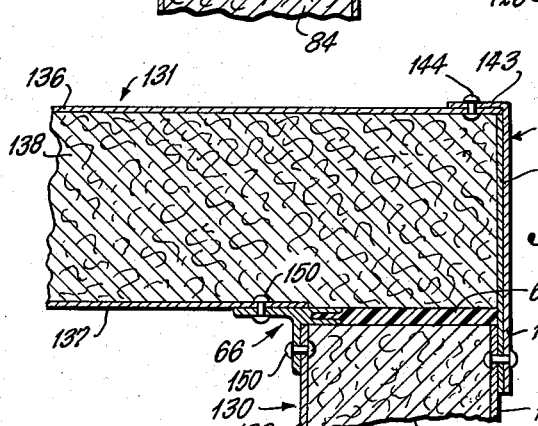
Fig. 9.
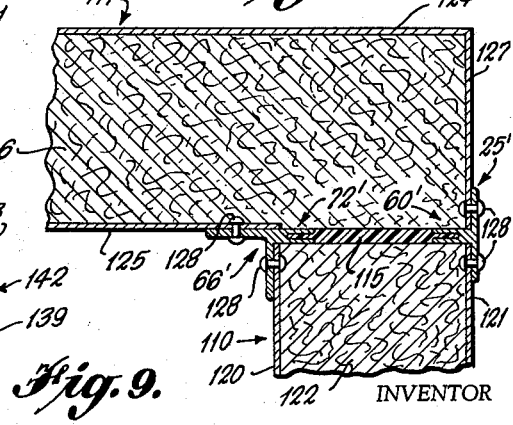
INVENTOR
Vardry D. Ramseur, Jr.
BY Shoemaker and Mattare
ATTORNEYS United States Patent Office 3,125,192
Patented Mar. 17, 1964

3,125,192
PANEL CONNECTOR ASSEMBLY
Vardry D. Ramseur, Jr., 212 Riverside Drive,
Greenville, S.C.
Filed Mar. 6, 1961, Ser. No. 94,413
8 Claims. (Cl. 189—34)

The present invention relates to a new and novel panel connector assembly, and more particularly to a panel connector assembly which is especially adapted to provide a structurally strong, insulated and vapor-tight joint between panels.

The present invention is particularly directed toward prefabricated panels wherein it is desired to form a joint between adjacent panels. While it should be understood that the present invention is suitable for use with different types of panels such as sandwich panels, curtain wall panels and the like, the invention has particular utility in connection with sandwich panels.

Sandwich panels are prefabricated panels including a relatively thin skin material with a relatively thick layer of a suitable core material disposed therebetween. The skin material is, of course, a relatively rigid strong material while the core material may have little structural strength and is generally employed for its insulating characteristics and the like.

In typical sandwich panels, the skin material may be metal, wood, plastic, composition board and sometimes ceramics. The core material may also be widely varied and typically may comprise honeycomb paper or aluminum, expanded plastics, wood fibers, glass fibers, and certain types of composition boards.

With the sandwich type panel construction, a very strong structural panel is provided which is very light in weight and yet at the same time has excellent insulating properties. Accordingly, this type of panel has enjoyed wide utilization in cold storage and deep freeze lockers, warehouses, process plants, transport trucks and containers. In addition, in modern day technology, many manufacturing processes require closely controlled humidity and temperature conditions and such insulating panels are very useful in buildings or other structures within which the manufacturing facilities are housed.

The manufacture and construction of sandwich type panels has been well-developed, but a major problem has arisen in efforts to effectively provide a simple means for forming a satisfactory joint between adjacent panels. In this connection, various requirements of such a joint must be considered.

First of all, the panel connector for forming a joint between adjacent panels must provide a structurally strong arrangement to provide a maximum degree of rigidity and strength to the over all assembly. Secondly, such a joint must serve to provide a vapor seal between the adjacent panels since in many cases it is essential to provide a vapor-tight joint to eliminate the possibility of transmission of moisture from one side of the panel to the other. Thirdly, the panel connector means must be such that the joint itself has good insulating properties, since excessive heat is often transferred through any metal-to-metal contact which may occur between adjacent panels.

The present invention provides a most simple and inexpensive structure for effectively obtaining the desired end results. The connector means itself comprises a relatively rigid structural member having flange means thereon. This flange means is adapted to be connected between portions of adjacent panels to rigidly secure the panels structurally to one another to provide a very strong joint. In addition, a resilient gasket means of insulating properties is provided, this gasket means being supported within a channels means formed on the rigid structural member. Means is provided for effectively locking the gasket means in place within the channel portion to prevent accidental separation of the gasket means from the rigid structural member. The gasket means is so dimensioned that it has a thickness greater than that of the channel portion of the rigid structural member, and accordingly, when the panel connector means is in assembled relationship with respect to two adjacent panels, the gasket means is in compressed condition such that it substantially fills the space between the panels to thereby ensure that a vapor-tight seal is obtained, the material of the gasket means itself serving as an effective insulating means.

The flange means as well as the channel means of the rigid structural member may be disposed in various angular relationships with respect to one another to enable the connector means to be associated with panel means in various applications. For example, the panel means may be disposed in end-to-end relation to one another or an end portion of one panel may abut an intermediate portion of another panel. In addition, the connector means is sufficiently versatile to permit its association with a panel when the panel is disposed adjacent either the floor or roof of the surrounding structure. In this manner, maximum versatility of use is obtained.

A particular advantage of the present invention is the fact that various lengths of the panel connector means may be manufactured and shipped to a job whereupon the connector means may be readily cut to the desired length in the field at the job site. This permits the panel connector means to be employed in many different situations, and tends to reduce any waste to a minimum since the various lengths of the panel connector means may be cut and tailored to specific lengths as desired.

A particular advantage of a joint formed with the panel connector means of the present invention is the fact that there is no metal-to-metal contact between opposite sides of the panels at the joint therebetween thereby providing a maximum degree of heat insulation while at the same time providing a strong and rigid interconnection between the panels.

An object of the present invention is to provide panel connector means which enables the formation of a structurally strong joint between adjacent panels.

Another object of the invention is the provision of panel connector means which enables the formation of an effective vapor seal between adjacent panels.

A further object of the invention is to provide panel connector means which enables the formation of a joint having good insulating properties between adjacent panels.

Yet another object of the invention is to provide panel connector means which is quite simple and inexpensive in construction, and yet which is effective and reliable in operation and requires a minimum of time and skill to install.

Other objects and many attendant advantages of the present invention will become more apparent when considered in connection with the specification and accompanying drawings, wherein:

FIG. 1 is an elevation partly in section of a panel connector assembly according to the present invention;

FIG. 2 is an enlarged sectional perspective view partly broken away illustrating the rigid structural member and resilient gasket means before connection to one another;

FIG. 3 is a view similar to FIG. 2 illustrating the structural member and gasket means after being secured to one another;

FIG. 4 is a broken-away sectional view illustrating a joint between two adjacent panels employing the construction shown in FIG. 3;

FIG. 5 is a sectional perspective view partly broken away illustrating a modified form of connector means;

FIG. 6 is a broken-away sectional view illustrating a joint between a wall panel and a ceiling panel employing the construction of FIG. 5;

FIG. 7 is a broken-away sectional view illustrating a joint between a wall panel and a floor employing the construction shown in FIG. 5;

FIG. 8 is a broken-away perspective view illustrating a joint between the outer wall panel and a roof panel; and FIG. 9 is a broken-away sectional view illustrating an alternative form of joint between an outside wall panel and a roof panel.

Referring now to the drawings wherein like reference characters designate corresponding parts throughout the several views, there is shown in FIG. 1 a panel connector assembly according to the present invention, wherein a plurality of panels 10 are disposed alongside one another and extend between a bottom wall or floor 11 and a top wall or roof 12.

As shown, the panels are four in number, it being understood that any number of size of panels may be employed with the present invention due to the adaptability and versatility of the arrangement.

Three vertically extending connector means 15 form structurally strong, insulated and vapor-tight joints between the side edges of the adjacent panels. Horizontally extending panel connector means 16 forms a joint between the upper edges of the panels and the roof structure 12 while another horizontally extending connector means forms a joint between the lower edges of the panels and the floor structure 11.

Referring now to FIGS. 2 and 3, the construction of the connector means may be more fully understood. As seen in these figures, a gasket means 20 in the form of a flat sheet of material is provided. This sheet of material is formed of a suitable resilient material which has good heat insulating properties.

For example, the gasket material could be rubber, plastic, foamed plastic, textile fabrics and paper products, the choice of gasket material depending upon the particular application.

A rigid structural member is connected to the opposite edges of the gasket means, and one of these rigid structural members is illustrated in FIGS. 2 and 3. Members 25 are formed with suitable rigid material such as metal or plastic, and are preferably extruded to the desired initial shape as shown in FIG. 2. As seen in FIG. 2, the integral structural member 25 includes a pair of laterally extending flange portions 26 and 27 which are in alignment with one another, and a normally extending portion 28 is provided between flange portions 26 and 27. Formed integral with and extending angularly from portion 28 are two leg portions 30 and 31 which as seen in FIG. 2 are initially sloped away from one another so as to provide an opening within which one edge portion of the gasket means may be inserted.

It is, of course, apparent that structural members 25 may be formed of any desired elongated length, and that only a relatively small portion of such members is illustrated in FIGS. 2 and 3.

Extending inwardly from leg 30 is a pair of longitudinally extending teeth 33 and 34, and a similar longitudinally extending tooth 35 extends inwardly from leg portion 31.

In assembling the apparatus, one edge portion of the gasket means as for example indicated by reference numeral 37 in FIG. 2 is inserted between the open leg portions 30 and 31 as seen in FIG. 2.

After the gasket material has been inserted between these leg portions, the legs are forced toward one another by any suitable means such as rollers or by press brake action so as to clamp the edge portion 37 of the gasket means 20 in compressed condition between the leg portions 30 and 31 as seen in FIG. 3.

It will be noted as seen in FIG. 3 that in the assembled position, the edge portion of the gasket means is considerably compressed between the leg portions and that the teeth 33, 34 and 35 serve to securely lock the edge portion of the gasket means between the leg portions to prevent the gasket means from pulling away from the rigid structural member.

A plurality of longitudinally spaced openings 40 are provided in the flange portions 26 and 27 to enable ready attachment of the rigid structural member to adjacent panels to provide the structural interconnection between such panels as will hereinafter more clearly appear.

Referring now to FIG. 4, an arrangement is illustrated wherein the novel connector means as illustrated in FIG. 3 is employed between a pair of adjacent panels 50 and 51. Panel 50 includes opposite outer skin portions 52 and 53 which may be formed of aluminum, and a core 54 is provided between the aluminum skins. The core may be for example a material identified as "Styrofoam" manufactured by the Dow Chemical Company, and comprising a bubble-type polystyrene plastic made by expanding cells of polystyrene. This core has an extremely low density, but possesses good thermal insulating properties. Panel 51 is of a similar construction to panel 50 and includes outer skin portions 55 and 56 similar to skin portions 52 and 53 and a core portion 57 similar to core portion 54 is provided between skin portions 55 and 56.

It will be noted that the adjacent end portions 58 and 59 of panels 50 and 51 respectively are spaced from one another.

The connector means forming the joint between adjacent end portions of panels 50 and 51 is constructed as illustrated in FIG. 3, and it will be noted that the gasket means 20 has the opposite edge portions thereof clamped within the channel portions indicated generally by reference numeral 60 of the two similar rigid structural members 25.

The term "channel portions" is employed to generally define the portion of the structural member including the legs 30 and 31 and the portion 28 which defines the space within which the edge portion of the gasket means is received. The flange portions of the structural members 25 are connected to the panels by rivets 61 which extend through the flange portions of the structural members and aligned openings suitably formed in the rigid skin portions of the adjacent panels.

It will be understood that the connector means indicated generally by reference numeral 15 in FIG. 1 include the oppositely facing structural members 25 as shown in FIG. 4, along with the resilient gasket means 20 connected therebetween. It will be noted that in the assembled position as seen in FIG. 4, the adjacent ends 58 and 59 of the panels 50 and 51 are abutted up against the outer faces of the leg portions of each of the structural members and that the resilient gasket means 20 is compressed between the adjacent ends of the panels since as seen in FIG. 3, the material of the gasket means normally extends laterally outwardly of the outer faces of the leg portions 30 and 31. The compression of the gasket means between the end portions of the panels as seen in FIG. 4 ensures completely filling any void space between panels with insulating material. It is, of course, evident that the riveted connections between the structural members 25 and the skins of the panels will provide a very rigid structural interconnection and there is of course no metal-to-metal contact from one side of the joint to the other which would produce excessive conductivity of heat through the joint.

Referring now to FIG. 5, a modified form of the panel connector means is illustrated wherein a gasket means 65 similar to the gasket 20 previously described is employed. In this modification, the rigid structural member indicated generally by reference numeral 66 is of modified construction, and in this case the flange portions 67 and 68 thereof are disposed substantially at right angles to one another and of course are provided with a longitudinally extending series of openings 70 there-through for attaching the flange portions to the skins of suitable panels.

The channel portion indicated generally by reference numeral 72 extends substantially normally to flange portion 68 and includes a pair of leg portions 73 and 74. Leg portion 73 is provided with inwardly extending teeth 77 and 78 while leg portion 74 is provided with an inwardly extending tooth portion 79, it being understood that these tooth portions extend longitudinally throughout the length of the leg portions parallel with the longitudinal axis of the structural member.

It is apparent that the gasket means 65 is clamped within the channel portion 72 in the same manner previously described, and the modified construction as shown in FIG. 5 permits the connector means to be used in different situations than the connector means as shown particularly in FIGS. 2, 3 and 4.

Referring now to FIG. 6, a joint is illustrated between a wall panel 80 and another panel or roof structure 81. Panel 80 includes the relatively rigid opposite skin portions 82 and 83 with an intermediate core portion 84 therebetween while panel 81 includes the opposite skin portions 85 and 86 with an intermediate core portion 87 therebetween.

The connector means as seen in FIG. 6 includes a pair of oppositely disposed structural members 66 identical with that disclosed in FIG. 5, and the gasket means 65 has the opposite longitudinally extending edge portions thereof clamped within the channel portions 72 of the structural members 66.

Flange portions 67 and 68 of the structural members 66 are rigidly attached to the skin portions of the panels by rivets 90. It will be observed that with this construction the members 80 and 81 are rigidly secured to one another and the gasket means 65 will be compressed between adjacent portions of members 80 and 81 to provide an insulating material in all voids therebetween.

Here again, the joint will, of course, have good insulating properties.

Referring now to FIG. 7, a further modified form of the structure shown in FIG. 5 is illustrated wherein it is desired to connect a panel indicated generally by reference numeral 100 to a floor structure 101 or the like. In this case, the panel 100 includes opposite skin portions 102 and 103 with a core portion 104 interposed therebetween. The rigid structural members 66 along with the gasket means 65 connected therebetween is identical with the connector unit shown in FIG. 6 and operates to provide an insulating barrier therebetween in a similar manner. In this modification, the flanges 67 are connected to the floor structure 101 by means of screws, or the like, 105 while the flanges 68 are connected to the skin portions of panel 100 by means of rivets 106.

Referring now to FIG. 8, a modification is illustrated wherein a panel 110 is connected to a roof structure or panel 111. In this modification, a combination of the structural members shown in FIGS. 3 and 5 is employed. In this case, a rigid structural member 66' similar to structural member 66 of FIG. 5 is employed in connection with a structural member 25' similar to structural member 25 shown in FIG. 2. A resilient gasket means 115 similar to the gasket means previously discussed has the opposite longitudinally extending edges thereof clamped within the channel portions 72' and 60' of structural members 66' and 25'. Here again in this modification the gasket means 115 is in compressed condition between the adjacent panel structures so as to provide a thorough insulating barrier with no through metal contact.

Panel member 110 includes opposite skin portions 120 and 121 with a core portion 122 interposed therebetween, while the roof structure 111 includes opposite skin portions 124 and 125 with a core portion 126 interposed therebetween. A skin portion 127 is provided along the end face of the roof structure 111. The structural members 66' and 25' are rigidly secured to the skin portions of the adjacent panel structures by rivets 128 thereby providing a strong rigid structural interconnection between the panel structure and the roof structure.

Referring now to FIG. 9, a modified form of interconnection between a panel structure 130 and a roof structure 131 is illustrated. This interconnection is a modification of the arrangement shown in FIG. 8, and a structural member 66 along with a gasket means 65 identical to that shown in FIG. 5 is employed.

The panel 130 includes opposite skin portions 132 and 133 having a core portion 134 interposed therebetween, while panel 131 comprises opposite skin portions 136 and 137 with a core portion 138 interposed therebetween. A skin portion 139 is formed along the end face of roof structure 131 and extends downwardly below the upper edge portion of the skin 133 formed on the outer surface of the panel 130.

In the modification shown in FIG. 9, the gasket means 65 abuts the inner surface of the skin surface 139 and the gasket means 65 is of course compressed between adjacent portions of panel 130 and roof structure 131.

In this modification, a longitudinally extending angle member 142 formed of a suitable structural material such as aluminum is provided, the upper leg portion 143 of the angle member being connected to the skin portion 136 of roof structure 131 by a plurality of rivets formed through aligned openings formed in the skin portion 136 and the leg portion 143.

The depending leg portion 145 of angle member 142 is connected with the skin portion 139 and the skin portion 133 by a plurality of rivets 146 extending through aligned openings in these skin portions and the leg portion 145. The flange portions of structural members 66 are connected to the skin portions 132 and 137 by means of rivets 150. It will thereby be seen that a rigid structural interconnection is provided between the panel 130 and the roof structure 131, and that the structural member 25' as shown in FIG. 8 has been eliminated and the angle member 142 substituted in place thereof for providing the desired structural interconnection between the panel and roof structure.

When the connector means is inserted between two adjacent panels and secured in place as shown, a very strong joint is provided which has no metal contact and yet which thoroughly fills all possible voids between the adjacent panels with an insulating material. To ensure a positive vapor-tight seal at the joint, a sealing type calking compound can be inserted between the flange portions of the structural members and the adjacent portions of the skin portions of the panels. In addition to rivets, an adhesive substance could be used to join the flange portions of the structural members to the skin portions of the panels.

It is apparent from the foregoing that there is provided a new and novel panel connector assembly employing novel connector means which enables the formation of a structurally strong joint between panels. The flanges of the connector means are riveted to the panel structures thereby providing a joint which is as strong and in most cases stronger than the remaining panel structure. The compressed resilient gasket means in each case provides a vapor-tight seal at the joint, and the gasket means is formed of a suitable material such as to provide good thermal insulation at the joint. The arrangement is quite simple and inexpensive in construction and yet is effective and reliable in providing the desired end results, and furthermore, the installation of the connector means requires a minimum amount of time and skill on the part of personnel assembling the structure. Maximum versatility is obtained since the connector means may be cut to any desired length at the job site thereby enabling the connector means to be tailored to any individual job.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A panel connector assembly compirsing a pair of panels disposed in closely spaced relationship to one another, connector means forming a structurally strong, insulated and vapor-tight joint between said panels, said connector means including rigid flange means secured to adjacent portions of each of said panels, said connector means also including channel means and flexible gasket means clamped within said channel means and extending angularly from said flange means, said gasket means substantially filling the space between said panels.

2. A panel connector assembly comprising a pair of panels disposed in closely spaced relationship to one another, connector means forming a structurally strong, insulated and vapor-tight joint between said panels, said connector means including rigid flange means secured to adjacent portions of each of said panels, said connector means also including a channel portion, a flexible gasket means retained in said channel portion and extending outwardly therefrom, said gasket means substantially filling the space between said panels.

3. An assembly as defined in claim 2, wherein said gasket means is compressed between adjacent portions of said panels to ensure complete filling of voids between panels with insulating material at all times.

4. A panel connector assembly comprising a pair of panels disposed in closely spaced relationship to one another, connector means forming a structurally strong, insulated, and vapor-tight joint between said panels, said connector means including a pair of flanges and a channel portion, each of said flanges being in abutting relationship with the outer surface of one of said panels, means attaching each of said flanges to the associated panel, the channel portion being disposed in the space between said panels, and a flexible gasket means, one edge portion of said flexible gasket means being secured within said channel portion, and said flexible gasket means substantially filling the remaining space between said panels.

5. A panel connector assembly comprising a pair of panels disposed in closely spaced relationship to one another, connector means forming a structurally strong, insulated and vapor-tight joint between said panels, said connector means including a pair of rigid structural members, each of said structural members including flange means and channel means, the flange means of each of said connector means being operatively connected to said panels to rigidly connect the panels, each of said channel means being disposed in the space between said panels, and a flexible gasket means having the opposite edge portions thereof secured within said channel means, said flexible gasket means substantially filling the remaining space between said panels.

6. A panel connector means for connecting and forming a joint between a pair of adjacent spaced panels comprising an elongated rigid structural member, said structural member including a flange portion and a channel portion, said channel portion including a pair of spaced leg portions, and a resilient gasket means having one edge portion thereof disposed within said channel portion and compressed between said leg portions, such that the said one edge portion of said gasket means has a reduced thickness within said channel portion, the remaining portion of said gasket means outwardly of said channel portion having a substantially greater thickness to ensure complete filling of any void space between adjacent panels with which the connector means is utilized.

7. Apparatus as defined in claim 6, including locking means extending inwardly from each of said leg portions toward the opposite leg portion for engaging the portion of the gasket means within the channel portion to thereby securely retain the gasket means in place.

8. A panel connector means for connecting and forming a joint between a pair of adjacent spaced panels comprising a rigid structural member, said structural member including a pair of flange portions, a channel portion extending substantially normally with respect to at least one of said flange portions, said channel portion including two spaced leg portions, said leg portions being formed of deformable material so as to be moved toward one another, a sheet of resilient material comprising a gasket means, one edge portion of said sheet being disposed in said channel portion and compressed between said leg portions such that the said one edge portion of said gasket means has a reduced thickness within said channel portion, the remaining portion of said gasket means outwardly of said channel portion having a substantially greater thickness to ensure complete filling of any void space between adjacent panels with which the connector means is utilized, the major portion of said sheet projecting outwardly of said channel portion, and locking means extending inwardly of each of said leg portions toward the opposite leg portion for maintaining said gasket means in operative position.

References Cited in the file of this patent

UNITED STATES PATENTS

| 1,843,430 | Mayer | Feb. 2, 1932 |
| 2,476,501 | Maniscalco | July 19, 1949 |

FOREIGN PATENTS

| 202,340 | Australia | July 5, 1956 |